United States Patent
Downey et al.

[11] Patent Number: 5,881,294
[45] Date of Patent: Mar. 9, 1999

[54] SYSTEM FOR TRANSFORMING PCI LEVEL INTERRUPTS

[75] Inventors: Harold Downey, Tempe; Timothy Shayne Carlson, Chandler, both of Ariz.

[73] Assignee: VLSI Technology, Inc., San Jose, Calif.

[21] Appl. No.: 820,648

[22] Filed: Mar. 18, 1997

[51] Int. Cl.$^6$ ........................................ G06F 9/46
[52] U.S. Cl. ...................... 395/733; 395/739; 395/742; 395/870
[58] Field of Search ............................ 395/733, 734–742, 395/870

[56] References Cited

U.S. PATENT DOCUMENTS

| | | | |
|---|---|---|---|
| 5,101,497 | 3/1992 | Culley et al. | 395/725 |
| 5,261,107 | 11/1993 | Klim et al. | 395/725 |
| 5,280,618 | 1/1994 | Takagi | 395/725 |
| 5,317,745 | 5/1994 | Chan | 395/700 |
| 5,555,413 | 9/1996 | Lohman et al. | 395/733 |
| 5,640,571 | 6/1997 | Hedges et al. | 395/734 |
| 5,649,703 | 7/1997 | Omid et al. | 395/734 |
| 5,664,200 | 9/1997 | Barlow et al. | 395/741 |
| 5,673,400 | 9/1997 | Kenny | 395/309 |
| 5,734,911 | 3/1998 | Lai | 395/742 |
| 5,740,452 | 4/1998 | Story et al. | 395/734 |

Primary Examiner—Thomas C. Lee
Assistant Examiner—Harold J. Kim
Attorney, Agent, or Firm—Wagner,Murabito&Hao

[57] ABSTRACT

A system for transforming computer system interrupts from state based interrupts to event based interrupts. The system of the present invention includes an interrupt acknowledge detection circuit adapted to detect an interrupt acknowledge from a computer system. The interrupt acknowledge detect circuit is coupled to a vector match circuit. The vector match circuit is adapted to receive an interrupt vector from the computer system and determine whether the interrupt vector matches a predetermined interrupt vector within the vector match circuit. The vector match circuit is, in turn, coupled to an interrupt assertion circuit. The interrupt assertion circuit includes an internal interrupt request line and an external interrupt request line. The interrupt assertion circuit functions by asserting an interrupt signal via the external interrupt request line to the computer system in response to receiving a state based interrupt via the internal interrupt request line. Subsequently, the interrupt assertion circuit deasserts the interrupt signal when the interrupt acknowledge is received by the interrupt acknowledge circuit and when the interrupt vector match is received by the vector match circuit. In so doing, the state based interrupt is transformed by the system of the present invention to a event based interrupt signal.

18 Claims, 8 Drawing Sheets

SYSTEM FOR TRANSFORMING PCI LEVEL INTERRUPTS

TECHNICAL FIELD

The present invention pertains to computer system interrupts. More particularly, the present invention relates to a method and system for transforming interrupts on a PCI (Peripheral Component Interconnect) expansion bus in a computer system from state to event.

BACKGROUND ART

Computers are being used today to perform a wide variety of tasks. Many different areas of business, industry, government, education, entertainment, and most recently, the home, are tapping into the enormous and rapidly growing list of applications developed for today's increasingly powerful computer devices. Computers have also become a key technology for communicating ideas, data, and trends between and among business professionals. These devices have become so useful and ubiquitous, it would be hard to imagine today's society functioning without them.

Computers operate by executing programs, or a series of instructions, stored in a memory. These programs and series of instructions are collectively referred to as software. Software is what makes computer systems function and perform useful tasks. The utility of a computer system often hinges upon the speed and efficiency with which the computer executes the software program. Hence, it is desirable that the processor of the computer execute software programs as fast as possible. As the processor executes a program, there may be several significant events occurring in the computer's peripheral system hardware. It is often necessary to signal the processor to respond to an external condition, even though the processor is executing a program. This signaling process is referred to as an interrupt.

Interrupts are changes in the flow of software execution not caused by the currently running program. Some other process, usually input or output related, is responsible for the change in the flow of execution. For example, a program may instruct a hard disk coupled to the computer system to begin a data transfer, and configure the hard disk to provide an interrupt as soon as the data transfer is complete. The interrupt stops the currently executing program and transfers control to an interrupt service routine (ISR) which performs some appropriate action. When finished, the ISR returns control of the processor to the interrupted program. The processor subsequently restarts the interrupted program in the same state it was in when the interrupt occurred.

The need for interrupts arise from the fact that, in most cases, input and output (IO) can proceed in parallel with processor execution. On computers where the processor issues an IO instruction and then stops to wait for the IO to be completed, there is no need for an interrupt. When the IO is finished, the processor is restarted at the instruction following the IO instruction. Because the processor can generally execute many hundreds of thousands, or even millions, of instructions during the time required to complete a single IO instruction, it is very wasteful to force the processor to be idle during this time. Interrupts and interrupt subsystems allow the processor to execute the program concurrently with the IO and be signaled as soon as the IO is completed.

Prior art FIG. 1 shows a flow chart of the basic steps of a prior art interrupt service process 100 for industry standard architecture (ISA) computer systems. As discussed above, an interrupt causes the processor to temporarily suspend execution of the current program and forces it to jump to the ISR. Process 100 shows the steps a processor performs in servicing an interrupt.

In step 10, the processor detects an interrupt request. The processor, in ISA bus based computer systems, has one interrupt request input that is used to detect interrupt requests. The interrupt request lines from the various IO devices are not coupled directly to the processor's interrupt request input, rather, the processor's one interrupt request input is coupled to a programmable interrupt controller (PIC) which, in turn, is coupled to as many as eight peripheral devices. The peripheral devices signal interrupt requests via the PIC.

In step 11, the processor responds to the interrupt request by generating an interrupt acknowledge. During the interrupt acknowledge, the processor determines which device requested the interrupt and fetches the address of the appropriate ISR. As discussed above, the ISR performs the appropriate action to service the interrupt.

In step 12, the program pointers and other information for the program currently executing are "pushed" onto the processor's stack. This allows the state of the currently executing program to be saved while the processor executes the ISR.

Next, in step 13, the processor jumps to the address of the appropriate ISR and begins executing it. The ISR subsequently services the interrupt. At this point, the processor executes the software of ISR, performing the tasks required to service the interrupt.

In step 14, the processor "returns" from the ISR. Each ISR ends with a return-from-interrupt instruction. When execution of the ISR is complete, the processor executes the return-from-interrupt instruction which automatically "pops" the program pointers and program information off of the processor's stack.

Thus, in step 15, the processor can continue execution of the interrupted program. The processor restarts execution in the same state the program was in prior to interruption.

In ISA bus computer systems, process 100 is implemented in an event based interrupt system. That is, an interrupt is a specific event which occurs and is detected by the computer system. In ISA bus systems, the interrupt request line coupled to the PIC is driven low and then either pulled up by a pull up resistor coupled to the interrupt request line or driven back up by the interrupting device (i.e., the source). The rising edge of the interrupt request line is detected by the PIC as an interrupt request. Thus, in ISA bus computer systems, the interrupt request line is "strobed." In such a system, the strobe constitutes an event, and the event is recognized as an interrupt request.

In newer, PCI (peripheral component interconnect) bus computer systems, however, the process 100 is implemented in a level, or state based, interrupt system. The steps of the process 100 are basically the same but the interrupt system is different. In PCI bus based computer systems, an interrupt is a state which is entered. The interrupt request line is driven low and kept low. The interrupt request line is coupled usually coupled to a programmable interrupt router (PIR) as opposed to a PIC. The PIR detects the low level as the interrupt request. The interrupt request line remains asserted until the source of the interrupt is serviced.

Newer computer systems are built around the PCI bus and utilize peripheral devices based on the PCI bus for much of their functionality. Accordingly, many computer system manufacturers are reusing older hardware designs and adapting older software applications to function on or within PCI bus based devices. However, many of the older hardware devices and software applications are intimately designed to the specific characteristics of the ISA bus. For example, many popular "legacy" software applications do not know how to interface with PCI bus based peripheral devices. Hence, these legacy software applications do not properly interface with the PCI bus environment. More particularly, the ISRs in the legacy applications were designed for the specific requirements of the ISA bus, not the PCI bus.

For example, audio peripheral devices (e.g., wave table sound boards) and other types of ISA peripheral devices utilize the ISA architecture interrupt system. One characteristic of the ISA architecture is that once an interrupt occurs, other interrupts can be masked and not recognized until the end of the current interrupt. This prevents a large number of interrupts from piling up, or "nesting". Some legacy applications allow the nesting of interrupts. They allow the interrupt service routine from one interrupt to be interrupted by another interrupt service routine. This is the case with software applications dealing with, time sensitive input and output, such as real time simulations using the audio peripheral device for example. In such an application, the nesting of interrupts help make the computer system more responsive to the user.

Thus, with reference still to prior art FIG. 1, when an interrupt is detected as in step 10, the computer system proceeds through steps 11, 12, and 13 in the manner described above. Once the ISR from the legacy application is started in step 13, it checks to see if there is another interrupt. If another interrupt is detected, steps 10 through 13 are again repeated, hence, nesting the interrupts. The nested interrupts are completed, one by one, until step 15 is reached from the original (i.e., the first to occur) interrupt and the legacy application can continue.

In the ISA bus, the interrupt request line returns to a deasserted state (i.e., a high level) immediately after the event (i.e., the strobe). Thus, in computer systems having an ISA bus, the ISR does not detect its own interrupt due to the fact that the interrupts are strobes. The event occurs and then goes away automatically. The strobe is latched by the PIC and the interrupt request line subsequently returns to normal.

In PCI bus based computer systems, however, the interrupt request line is asserted low, and typically remains low until the source is serviced. Thus, when the legacy application ISR checks for another interrupt in step 13, it detects its own interrupt state signal since it was never removed. The legacy ISR then erroneously concludes that there is another interrupt, and the system subsequently executes steps 10 through 13 again. This fetches the same ISR again, which executes the same instructions again, which detects itself as another interrupt. The loop continues until the stack over flows, crashing the computer system.

Hence, legacy applications do not know how to interface with the PCI bus environment's state based interrupt system. When a legacy ISR checks to see if there is another interrupt without clearing its own interrupt, it detects its own interrupt as a "new" interrupt. This same scenario keeps happening, repeating itself until the system crashes. It is expected, however, that these legacy applications be supported by the newer computer systems. The newer computer systems are expected to run the great majority of the legacy applications.

Additionally, many older hardware designs are being incorporated into PCI bus based devices. Newer systems increasingly rely on the more modern PCI bus for IO. Consequently, many commonly used preexisting ISA bus based designs are being incorporated into modern PCI bus based IO devices. Often, these preexisting ISA bus based designs do not interface properly with the PCI bus environment's state based interrupt system.

Therefore, what is required is a system for accommodating legacy software applications in PCI bus based computer systems. What is further desired is a system which ensures preexisting ISA bus based designs properly interface with the PCI bus environment's state based interrupt system. The required solution should not require extensive reworking of legacy software applications or preexisting ISA bus based designs. The required solution should be transparent to both.

DISCLOSURE OF THE INVENTION

The present invention provides a system for accommodating legacy software applications in PCI bus based computer systems. The system of the present invention ensures preexisting ISA bus based designs properly interface with the PCI bus environment's state based interrupt system. Additionally, the present invention does not require extensive reworking of legacy software applications or preexisting ISA bus based designs, thus providing a solution transparent to both.

The present invention comprises a system for transforming computer system interrupts from state based interrupts to event based interrupts. The system of the present invention includes an interrupt acknowledge circuit adapted to receive an interrupt acknowledge from a computer system. The interrupt acknowledge circuit is coupled to a vector match circuit. The vector match circuit is adapted to receive an interrupt vector from the computer system and determine whether the interrupt vector matches a predetermined interrupt vector within the vector match circuit. The vector match circuit is, in turn, coupled to an interrupt assertion circuit. The interrupt assertion circuit includes an internal interrupt request line and an external interrupt request line. The interrupt assertion circuit functions by asserting an interrupt signal via the external interrupt request line to the computer system in response to receiving a state based interrupt via the internal interrupt request line. Subsequently, the interrupt assertion circuit deasserts the interrupt signal when the interrupt acknowledge is received by the interrupt acknowledge circuit and when an interrupt vector match is received by the vector match circuit.

When the interrupt acknowledge circuit receives the interrupt acknowledge and when the interrupt vector matches the predetermined interrupt vector, the interrupt vector corresponds to an interrupt request previously asserted by the system of the present invention. Consequently, the interrupt assertion circuit deasserts the interrupt signal. In so doing, the state based interrupt is transformed by the system of the present invention to an event based interrupt signal. In this manner, the present invention provides a method and system for transforming state based interrupts to event based interrupts which are compatible with a state based bus environment. In so doing, the present invention accommodates legacy hardware designs and legacy software applications in a manner transparent to both.

BRIEF DESCRIPTION OF THE DRAWINGS

The present invention is illustrated by way of example and not by way of limitation, in the figures of the accompanying drawings and in which like reference numerals refer to similar elements and in which.

Prior Art

BEST MODE FOR CARRYING OUT THE INVENTION

A method and system for transforming computer system interrupts from state based interrupts to event based interrupts is disclosed. In the following description, for the purposes of explanation, numerous specific details are set forth in order to provide a thorough understanding of the present invention. It will be obvious, however, to one skilled in the art that the present invention may be practiced without these specific details. In other instances, well-known structures, devices, and processes are shown in block diagram form in order to avoid unnecessarily obscuring the present invention.

In the present embodiment, the present invention transforms state based interrupts to event based interrupts compatible with the industry standardized and well known PCI bus architecture. However, it should be appreciated that the method and system of the present invention is well suited to transforming state based interrupts to event based interrupts compatible with differing bus architectures. As such, the present invention can be used to transform state based interrupts to event based interrupts compatible with, for example, the VESA (Video Electronics Standards Association) bus.

Figure 1:
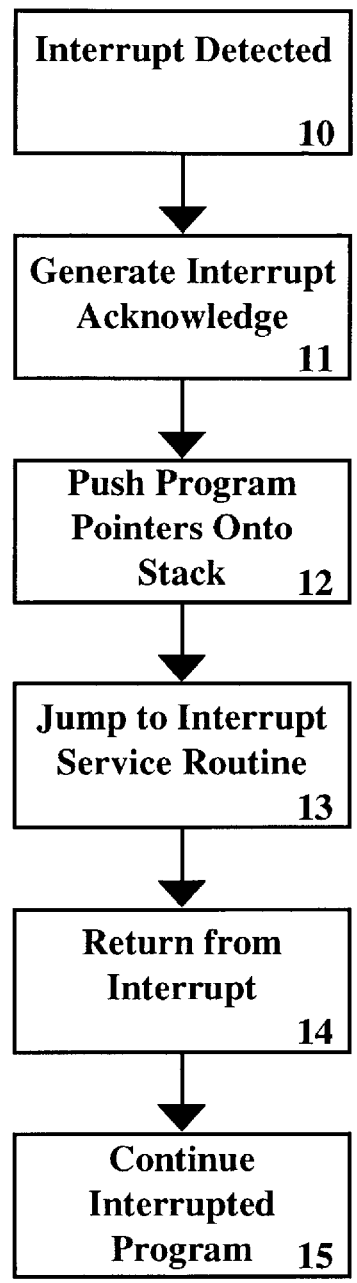
FIG. 1 shows a flow chart of the basic steps of a prior art interrupt service process for industry standard architecture computer systems.
Figure 2:
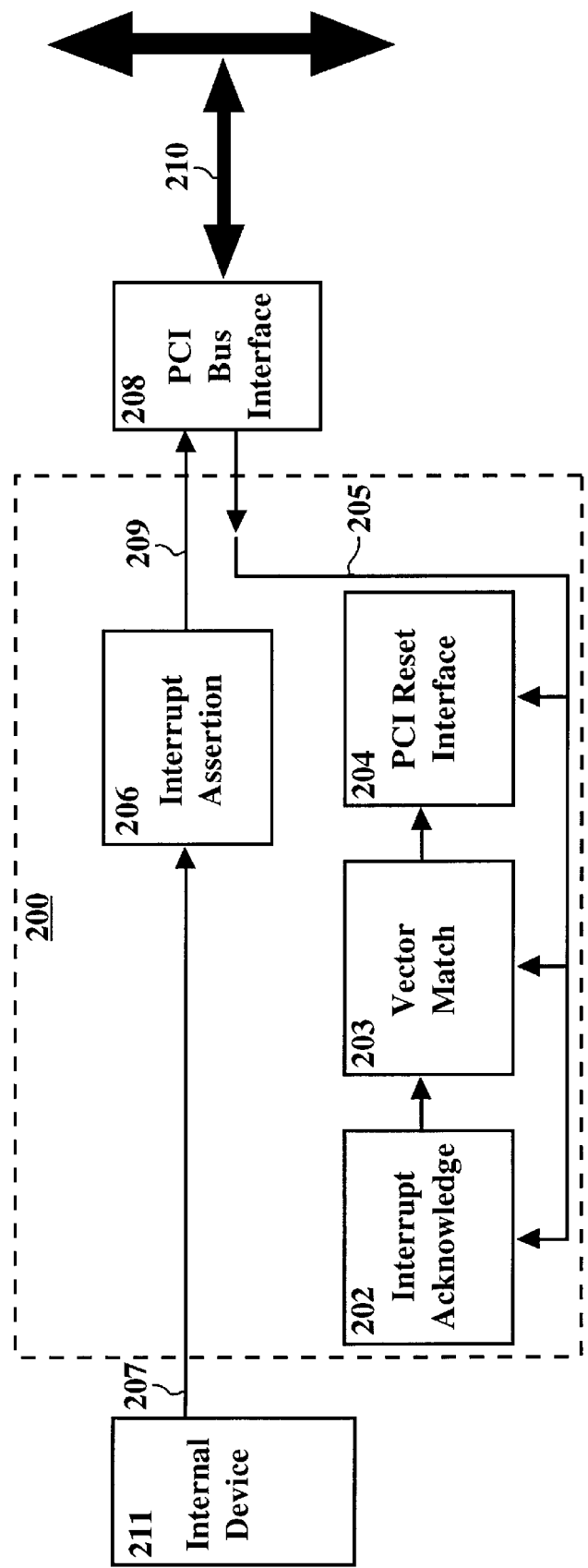
FIG. 2 shows a block diagram of an interrupt transformer in accordance with one embodiment of the present invention.

FIG. 2 shows a block diagram of an interrupt transformer 200 in accordance with one embodiment of the present invention. The interrupt transformer 200 comprises a system for transforming state based interrupts to event based interrupts. The interrupt transformer 200 includes an interrupt acknowledge detect circuit 202 coupled to a vector match circuit 203 which is in turn, coupled to a PCI reset interface circuit 204. The interrupt acknowledge detect circuit 202, vector match circuit 203, and PCI reset interface circuit 204 are each coupled to an internal bus 205, and receive PCI signals via internal bus 205. The internal bus interface 205 is coupled to a PCI interface 208 which is in turn, coupled to a PCI bus 210. The PCI reset interface circuit 204 is coupled to an interrupt assertion circuit 206. The PCI interrupt assertion circuit is coupled to an internal device 211 via internal interrupt line 207 and is coupled to the PCI interface 208 via an external interrupt request line 209.

The interrupt transformer 200 of the present invention functions by transforming state based interrupts from an internal device 211 into event based interrupts. The PCI bus environment in which the present invention is utilized is a state based environment. PCI signals are state based signals which are asserted and deasserted into and out of "states." In PCI bus based computer systems, an interrupt signal, like other PCI signals, is a state which is entered. The PCI interrupt request line, for example, is asserted and kept asserted. PCI signals are valid at rising clock edges. At a rising clock edge, the PCI interrupt request line is sampled, and hence, if the PCI interrupt signal is asserted at the rising clock edge, a valid PCI interrupt request is recorded by the computer system.

By transforming state based interrupts to event based interrupts, legacy software applications designed to work in ISA bus environments with ISA event interrupts can properly interface with a PCI bus based computer system. The interrupt transformer 200 transforms the state based interrupts to event based interrupts in such a manner as to maintain compatibility with the state based environment of a PCI bus computer system. Hence, event based interrupts emerging from the interrupt transformer 200 of the present invention follow the necessary PCI specification protocols (e.g., signals being valid at rising clock edges, and the like). Thus, while the event based interrupts emerging from the interrupt transformer 200 are not strobe interrupts, as in ISA bus based computer systems, they are fully compatible with both the legacy software applications and the PCI bus environment.

The interrupt transformer 200 is coupled to the internal device 211 via an internal interrupt request line 207. The internal device 211 is typically a legacy hardware device designed to interface with an ISA bus environment. In order to function in a PCI bus environment, the internal device 211 asserts state based interrupts compatible with the state based environment of the PCI bus as opposed to event based interrupts. These state based interrupts remain asserted until the interrupt is serviced. With modern software applications written to interface with the PCI bus, the internal device 211 functions properly. As described above, the state based interrupts emerging from the internal device 211 need to be transformed by the interrupt transformer 200 in order for the internal device 211 to function properly with legacy software applications. Thus, in the present embodiment, the interrupt assertion circuit 206 detects a state based interrupt (i.e., an internal interrupt request) from the internal device 211 via the internal interrupt request line 207. The interrupt assertion circuit subsequently asserts a corresponding PCI interrupt signal via the external interrupt request line 209 by driving the external interrupt request line low. The external interrupt request line remains asserted until the interrupt request is acknowledged.

Once the PCI interrupt signal is asserted, the computer system's processor recognizes the interrupt request on the next instruction boundary. The processor automatically saves its place in the interrupted program and generates two back to back interrupt acknowledge bus cycles. The first bus cycle prioritizes pending interrupt requests (if more than one) and the second bus cycle requests an interrupt vector number (or the highest priority interrupt vector number when there is more than one interrupt request). The interrupt vector number corresponds to a table entry which yields the starting address for the ISR corresponding to the interrupting device (in this case, the internal device 211).

In the present invention, once the interrupt request corresponding to the PCI interrupt signal is acknowledged and the interrupt vector is supplied, the interrupt acknowledge detect circuit 202 and the vector match circuit 203, signal the interrupt assertion circuit 206 via the PCI reset circuit 204 to deassert the PCI interrupt signal. The interrupt acknowledge detect circuit 202 is coupled to the internal bus 205 and is adapted to detect an interrupt acknowledge. The interrupt acknowledge is a PCI bus cycle transmitted from the computer system via the PCI bus 210 and is coupled to the internal bus 205 via the PCI interface 208. Upon receiving the interrupt acknowledge, the interrupt acknowledge detect circuit 202 enables the vector match circuit 203. The vector match circuit 203 is adapted to receive an interrupt vector from the PCI bus 210 and determine whether the interrupt vector matches a predetermined interrupt vector within the vector match circuit 203. If the interrupt vector matches the predetermined vector, the interrupt request asserted by the interrupt assertion circuit 206 is being serviced.

The vector match circuit 203, upon a vector match, transmits a deassertion signal to the interrupt assertion circuit 206 via the PCI reset interface circuit 204. The deassertion signal causes the interrupt assertion circuit 206 to deassert the PCI interrupt signal on the external interrupt request line 209. Since the external interrupt request line 209 is coupled to the PCI bus 210 via the PCI interface 208, the PCI interrupt signal coupled to the computer system is deasserted.

In so doing, the state based interrupt on the internal interrupt request line 207 is transformed into a event based interrupt (i.e., the PCI interrupt signal) on the external interrupt request line 209. The PCI interrupt is asserted, entering the interrupt event, and remains asserted until the ISR corresponding to the interrupting device is entered via the interrupt vector. Once the interrupt vector match is received by the vector match circuit 203, a deassertion signal is transmitted and the PCI interrupt is deasserted.

The PCI reset interface circuit 204 couples the deassertion signal from the vector match circuit 203 to the interrupt assertion circuit 206. In addition, the PCI reset interface circuit 204 interfaces interrupt transformer 200 with the PCI reset signal from the PCI bus 210. The PCI reset signal is used by the computer system to reset all devices coupled to the PCI bus 210. The PCI reset signal may be asserted by the computer system synchronously via the PCI bus 210 and transitions PCI configuration registers, master and target state machines, and output drivers of the various PCI devices coupled to the PCI bus 210 to their respective initialization states. The PCI reset signal line is one of the many signal lines comprising PCI bus 210 and is coupled to the PCI reset interface circuit 204 via PCI interface 208 and the internal bus 205. Thus, when the PCI reset signal is asserted, the PCI reset interface 204 transmits the deassertion signal to the interrupt assertion circuit 206 independently. This deassertion signal is transmitted without regard to any deassertion signal transmitted from the interrupt vector match circuit 203. Upon receiving the deassertion signal, the interrupt assertion circuit 206 deasserts the PCI interrupt signal. In so doing, the interrupt transformer 200 of the present invention complies with the requirements of the PCI specification.

Thus, the interrupt transformer 200 of the present invention transforms state based interrupts from the internal device 211 to event based interrupts compatible with the PCI bus environment. In so doing, the internal device 211 is properly interfaced with the PCI bus environment's state based interrupt system. In the present embodiment, internal device 211 comprises a preexisting ISA bus based design. The process of the present invention accommodates the internal device 211 without redesign of its interrupt logic or architecture. By ensuring preexisting ISA bus based designs interface properly with the PCI bus environment, the present invention accommodates legacy software applications built to work with these preexisting designs. The internal device 211, for example, can be an older industry standard audio device having a large number of software applications designed to work with it. By properly interfacing the preexisting device 211, the interrupt transformer 200 of the present invention accommodates these legacy software applications without requiring a redesign of their software code. In this manner, the interrupt transformer 200 of the present invention accommodates preexisting hardware designs and legacy software applications in a manner transparent to both.

Figure 3:
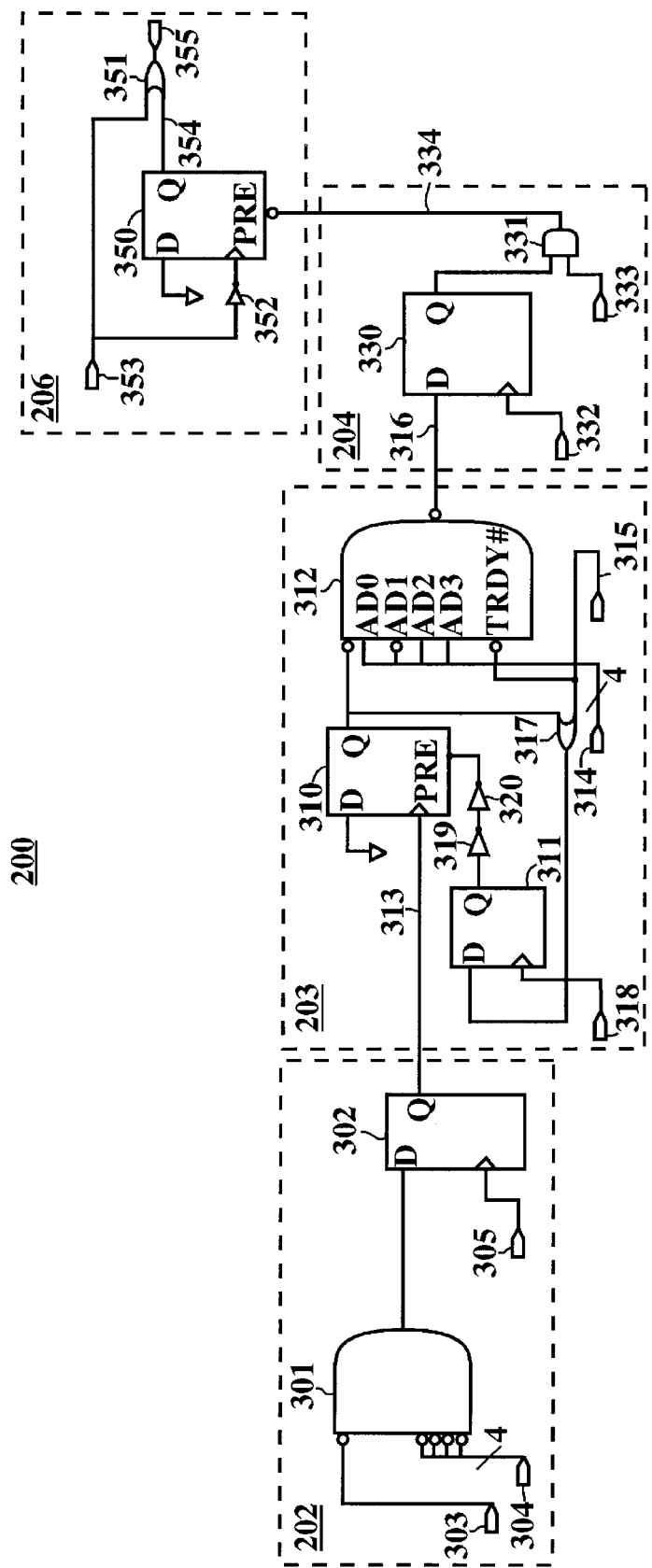
FIG. 3 shows an interrupt transformer in accordance with one embodiment of the present invention in greater detail.

With reference now to FIG. 3, an interrupt transformer 200 in accordance with one embodiment of the present invention is shown in greater detail. As discussed above, the interrupt transformer 200 includes the interrupt acknowledge detect circuit 202, the vector match circuit 203, the PCI reset interface circuit 204, and the interrupt assertion circuit 206. Additionally, as described below, the interrupt acknowledge detect circuit 202, the vector match circuit 203, the PCI reset interface circuit 204, and the interrupt assertion circuit 206 each receive PCI signals via the internal bus 205 of FIG. 2.

The interrupt acknowledge detect circuit 202 includes an AND gate 301 coupled to a flip-flop 302 (the present embodiment utilizes flip-flops to implement latching circuits). The AND gate 301 has an input 303 coupled to the PCI signal Frame (FRAME#) and four inputs 304 coupled to the PCI signals Command/Byte Enable (C/BE#[0:3]) via the internal bus 205 (shown in FIG. 2). The PCI bus specification defines the first interrupt acknowledge bus cycle (as described above) as the assertion of the FRAME# signal synchronously with each C/BE# signal being low. Thus, when an interrupt acknowledge occurs, a logical one is asserted to the Data (D) input of flip-flop 302. The PCI clock signal (PCI CLK) is coupled to the clock input 305 of flip-flop 302. On the subsequent PCI CLK cycle, the logical one at the D input of flip-flop 302 is latched into the Q output of flip-flop 302. This logical one (i.e., an interrupt acknowledge detect signal) is coupled to the vector match circuit via line 313. In this manner, the interrupt acknowledge detect circuit 202 detects an interrupt acknowledge from the computer system.

The vector match circuit 203 includes a flip-flop 310 and a flip-flop 311 coupled to a NAND gate 312. The clock input of flip-flop 310 is coupled to receive the Q output of flip-flop 302 from the interrupt acknowledge circuit 202 via line 313. The D input of flip-flop 310 is coupled to logical zero (i.e., ground) and the Q output of flip-flop 310 is coupled to an input of the NAND gate 312. Thus, when a logical one (i.e., the interrupt acknowledge signal) is received from the interrupt acknowledge circuit 202 via line 313, a logical zero is latched onto the Q output of flip-flop 310, "enabling" the vector match circuit 203.

During the interrupt acknowledge cycle, the vector number is returned during the data transfer phase of the cycle, indicated by assertion of the Target Ready (TRDY#) signal. During the data transfer phase, the interrupt vector number is present on the lowest four bits of the address/data lines (AD[3:0]). In the present embodiment, the four address/data lines are coupled to NAND gate 312 via input 314 such that they code for the vector corresponding to the ISR for the internal device 211 of FIG. 2. In addition, the PCI bus signal Target Ready (TRDY#) is coupled to input 315 of NAND gate 312. Thus, when an interrupt acknowledge is detected by the interrupt acknowledge detect circuit 202, and when a corresponding vector match (e.g., IRQ 5 which corresponds to vector number 0DH in the present embodiment) is received on the subsequent bus cycle while TRDY# is asserted, the computer system is servicing the PCI interrupt signal transmitted by interrupt transformer 200. The output of NAND gate 312, and hence the output of vector match circuit 203, becomes a logical zero (i.e., the deassertion signal) and is transmitted to the PCI reset interface circuit 204 via line 316.

The D input of flip-flop 311 subsequently latches the sum of the Q output of flip-flop 310 and the TRDY# signal from input 315 via OR gate 317. The flip-flop input 318 is coupled to the PCI CLK signal. The Q output of flip-flop 311 is coupled to the preset (PRE) input of flip-flop 311 via a pair of inverters 319 and 320. Thus, when the Q output of flip-flop 310 becomes a logical zero and when TRDY# is asserted via input 315, the Q output of flip-flop 311 presets a logical one back onto the Q output of flip-flop 310. The inverters 319 and 320 provide a predetermined amount of delay. In this manner, flip-flop 311 "readies" the interrupt vector match circuit 203 for a subsequent interrupt acknowledge detect notification via line 313 from the interrupt acknowledge detect circuit 202. This action prevents accidental deassertion if interrupt vector number does not match during an interrupt acknowledge cycle.

The PCI reset interface circuit 204 includes a flip-flop 330 coupled to an AND gate 331. The D input of flip-flop 330 is coupled to line 316 to receive the output of the interrupt vector match circuit 203. Input 332 is coupled to the PCI CLK signal. The Q output of flip-flop 330 is coupled to a first input of AND gate 331. The PCI reset signal (RST#) is coupled a second input of the AND gate 331 via input 333. The output of the AND gate 331 is coupled to line 334. Thus, when a corresponding vector match is received by the vector match circuit 203, a logical zero (i.e., the deassertion signal) is latched onto the Q output of the flip-flop 330, transmitted to the AND gate 331, and to the interrupt assertion circuit 206 via line 334. The logical zero (i.e., the deassertion signal) on line 334 causes the deassertion circuit to deassert the PCI interrupt signal by presetting flip flop 350 which sets the Q output of flip flop 350 to a logical one.

The PCI specification requires all devices coupled to the PCI bus to transition to a benign state when RST# is asserted. Thus, when RST# is asserted and received by the PCI reset interface circuit 204 via input 333, the output of AND gate 331 becomes a logical zero and is transmitted to the interrupt assertion circuit 206 via line 334. The logical zero on line 334 causes the deassertion circuit to preset flip flop 350 and therefore deassert the PCI interrupt signal, in compliance with the PCI specification and regardless of the output from the vector match circuit 203 on line 316.

The interrupt assertion circuit 206 includes a flip-flop 350, an OR gate 351, and an inverter 352. Input 353 is coupled to the internal interrupt request line 207 of FIG. 2. Input 353 is also coupled to the clock input of flip-flop 350 via the inverter 352 and to one input of the OR gate 351. The D input of flip-flop 351 is coupled to a logical zero (i.e., ground). The Q output of flip-flop 350 is coupled to another input of the OR gate 351 via a first interrupt output line 354. The output of the OR gate 351 is coupled to the external interrupt request line 209 of FIG. 2 via a second interrupt output line 355 and eventually becomes a PCI interrupt signal. The PRE input of flip-flop 350 is coupled to the output of the PCI reset interface circuit 204 via the line 334.

When a state based interrupt is received from the internal device 211 of FIG. 2 via input 353, a logical zero is latched onto the Q output of flip-flop 350. This places a logical zero on the first interrupt output line 354 coupled to one input of the OR gate 351 and a logical zero on the other input of the OR gate 351 from the input 353. This causes a logical zero to be asserted on the second interrupt output line, asserting the PCI interrupt signal on the external interrupt request line 209 (shown in FIG. 2). The PCI interrupt signal remains asserted until the deassertion signal is received from the PCI reset interface circuit 204 via line 334. As discussed above, the deassertion signal can originate from either the vector match circuit 203 or from the RST# signal coupled to the PCI reset interface circuit 204. Line 334 couples to the PRE input of flip-flop 350. Thus, the deassertion signal causes the flip-flop 350 to preset back to a logical one on its Q output, coupling the logical one to the input of OR gate 351 via first interrupt output line 354, driving second interrupt output line 355 to a logical one, and deasserting the PCI interrupt signal.

In addition, the interrupt assertion circuit 206 supports a software based deassertion of the PCI interrupt signal. In the event interrupt transformer 200 is coupled to a PCI bus in a computer system which does not support bus based interrupt acknowledge broadcasts, input 353 is coupled directly to the OR gate 351. Thus, a software application (e.g., an ISR) communicating with the internal device 211 of FIG. 2 can deassert the PCI interrupt signal by instructing the internal device 211 to deassert the internal interrupt request, hence, driving input 353 to a logical one and deasserting the PCI interrupt signal.

Figure 4A:
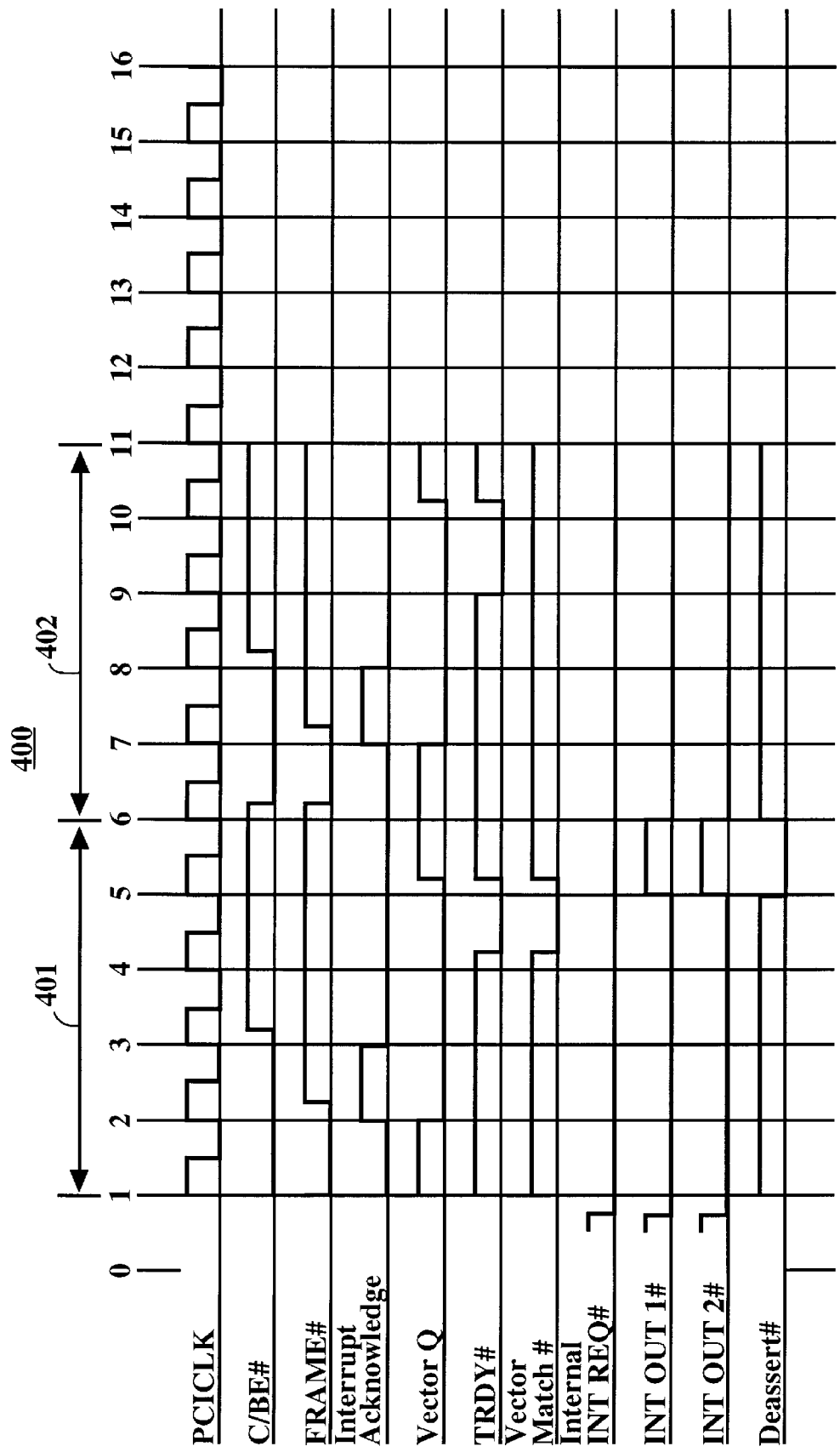
FIG. 4A shows a first timing diagram in accordance with one embodiment of the present invention.
Figure 4B:
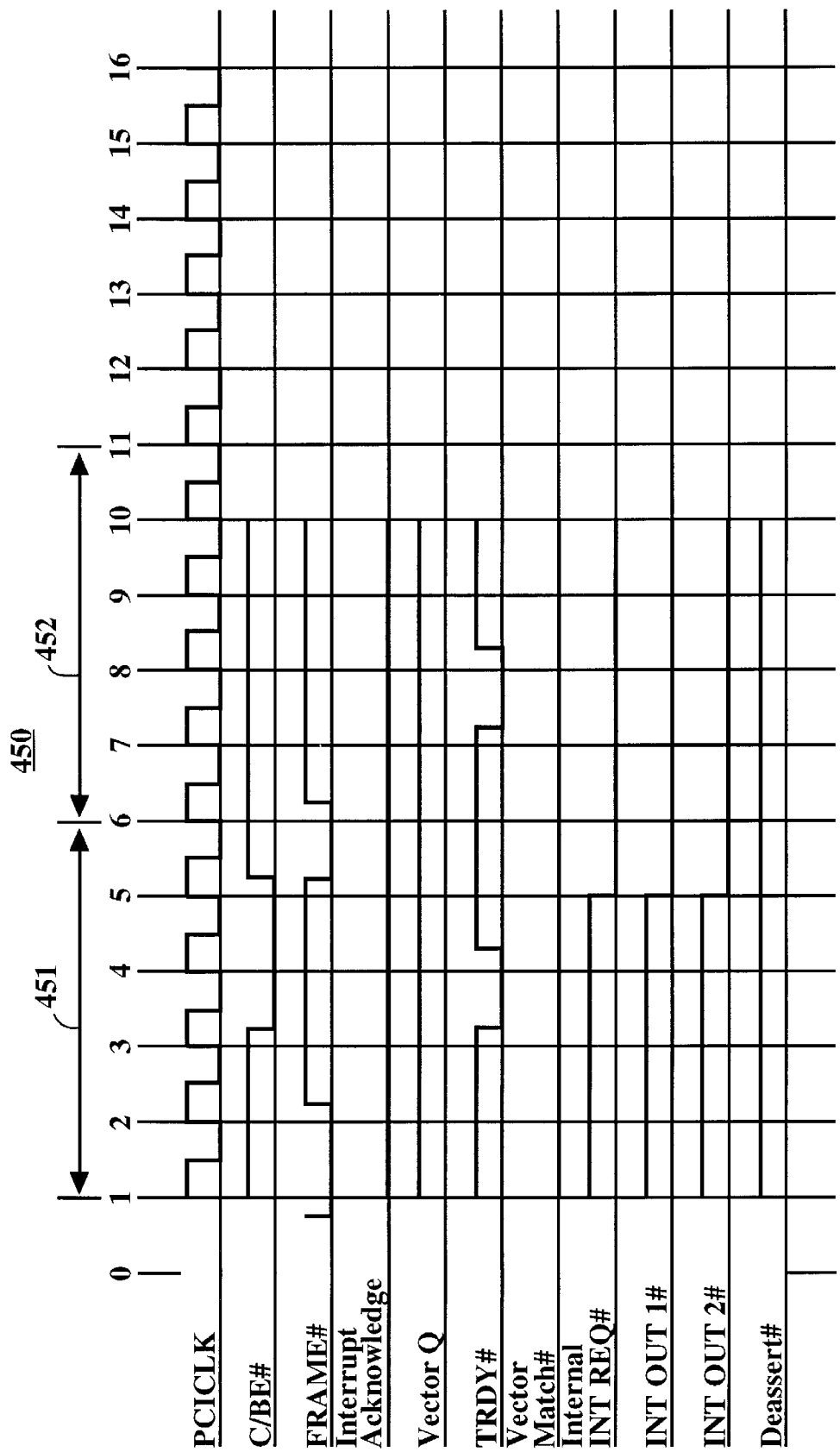
FIG. 4B shows a second timing diagram in accordance with one embodiment of the present invention.

With reference now to FIG. 4A and FIG. 4B, a timing diagram 400 and a timing diagram 450 are respectively shown. Timing diagram 400, in accordance with interrupt transformer 200 of the present invention, shows the state of the primary signals (i.e., PCI CLK, C/BE#, FRAME#, Interrupt Acknowledge, Vector Q, TRDY#, Vector Match#, Internal INT REQ#, INT OUT 1#, INT OUT 2#, and Deassert#) of interrupt transformer 200 through its course of operation with a computer system. C/BE# corresponds to all four C/BE#[3:0] signals and is shown as a logical zero when all four C/BE#[3:0] signals are logical zero and a logical one when all four C/BE#[3:0] signals are not logical zero (e.g., C/BE#0 is a logical one while C/BE#1, C/BE#2, and C/BE#3 are logical zeros). Interrupt Acknowledge detect corresponds to the output of the interrupt acknowledge circuit 202 (i.e., line 313). Vector Q corresponds to the Q output of flip-flop 310 of the vector match circuit 203. Vector Match# corresponds to the output of the vector match circuit 203 (line 316). Internal INT REQ# corresponds to the internal interrupt request received from the internal device via line 207 of FIG. 2 and line 353 of FIG. 3. INT OUT 1# corresponds to the signal on the first interrupt output line 354 and INT OUT 2# corresponds to the PCI interrupt signal on the second interrupt output line 355. Deassert# corresponds to the deassertion signal on line 334. FRAME#, TRDY#, and PCI CLK are standard PCI bus signals.

Timing Diagram 400 shows a region 401 and a region 402. Region 401 illustrates the case of an interrupt acknowledge cycle with a corresponding vector match. Prior to clock cell 1, Internal INT REQ# is asserted by the internal device 211, requesting an interrupt. At the rising edge of clock cell 2, C/BE# is zero with FRAME# asserted (i.e., zero), signifying an interrupt acknowledge cycle. At the rising edge of clock cell 5, TRDY# is sampled asserted with the corresponding vector present, thus, asserting Vector Match#. Hence, on the next clock cycle (the rising edge of clock cell 5), the Deassert# signal is driven to zero, driving INT OUT 1# and INT OUT 2# to one.

Region 402 illustrates the case of an interrupt acknowledge cycle without a corresponding vector match. Prior to clock cell 6, Internal INT REQ# is asserted by the internal device 211, requesting an interrupt. At the rising edge of clock cell 7, C/BE# is zero with FRAME# asserted, signifying an interrupt acknowledge cycle. At the rising edge of clock cell 10, TRDY# is sampled asserted, however, the corresponding vector is not present, hence, Vector Match# remains high and Deassert# remains high.

With reference next to the timing diagram 450 of FIG. 4B, a region 451 and a region 452 are shown. Region 451 illustrates the case of PCI bus activity without an interrupt acknowledge. Prior to clock cell one, the internal INT REQ, INT OUT 1#, and INT OUT 2#, are all deasserted (i.e., logical one), indicating a non-interrupt state of operation for the internal device 211. Prior to clock cell one, FRAME# is asserted while C/BE# is not zero, indicating ordinary data transaction activity on the PCI bus 210. At the rising edge of clock cell 4, C/BE# is zero while FRAME# is deasserted (i.e., logical one), again, indicating ordinary data transaction activity. Thus, through region 451, both INT OUT 2# and Deassert# remain high.

Region 452 illustrates the case of an interrupt request and a wait for an interrupt acknowledge cycle. At the rising edge of clock cell 5, Internal INT REQ#, INT OUT 1#, and INT OUT 2# are each asserted, asserting the PCI interrupt signal via line 355. The interrupt transformer 200 subsequently waits for an interrupt acknowledge cycle, keeping INT OUT 2# asserted. From clock cell 6 through clock cell 9, there is not an interrupt acknowledge cycle as C/BE# remains high. Thus, Deassert# remains high. In this manner, INT OUT 2# maintains the PCI interrupt signal until an acknowledgment is received or a PCI reset (not shown) is asserted.

Figure 5:
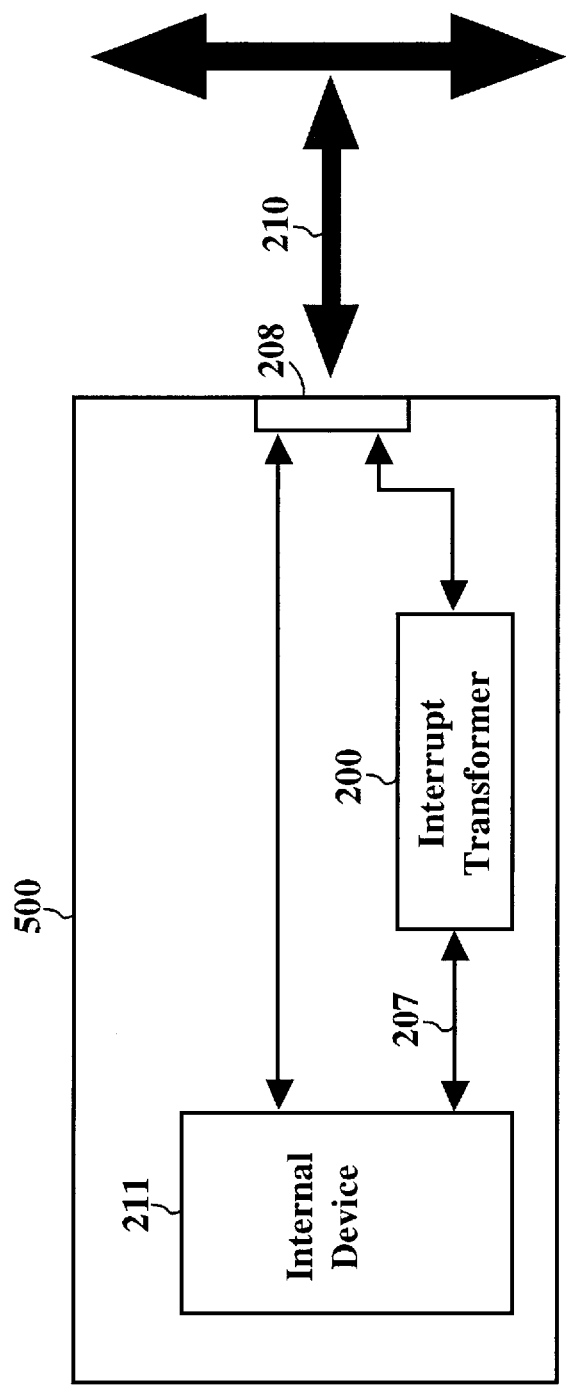
FIG. 5 shows a PCI expansion card in accordance with one embodiment of the present invention.

Referring now to FIG. 5, a PCI expansion card 500 in accordance with the present invention is shown. Expansion card 500 includes the internal device 211 coupled to the interrupt transformer 200 via the internal interrupt request line 207. The internal device 211 and the interrupt transformer 200 are both coupled to the PCI interface 208. Expansion card 500 couples to the PCI bus 210 via PCI interface 208, hence, coupling the internal device 211 and the interrupt transformer 200 to the PCI bus 210.

Figure 6:
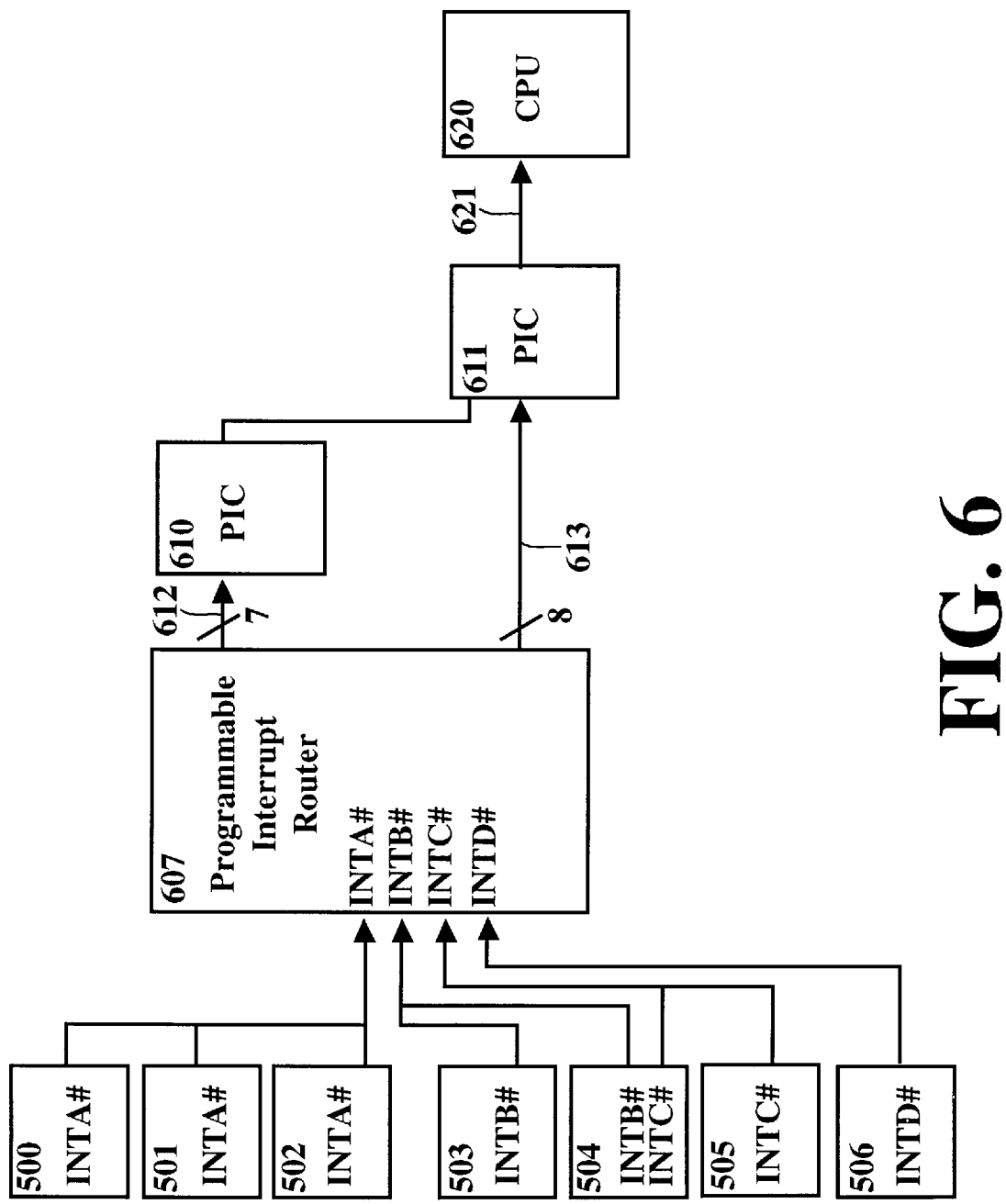
FIG. 6 shows a computer system in accordance with the present invention is shown.

With reference now to FIG. 6, a computer system 600 in accordance with the present invention is shown. Computer system 600 includes a plurality of expansion cards, expansion card 500 through expansion card 506 (hereafter expansion cards 500–506). Each of expansion cards 500–506 is coupled to a Programmable Interrupt Router (PIR) 607. PIR 607 is coupled to the computer system's central processor unit (CPU) 620 via a first Programmable Interrupt Controller (PIC) 610 and a second PIC 611. It should be appreciated that expansion cards 500–506 are each coupled to the PIR 607 via one of four PCI interrupt request lines, INTA#, INTB#, INTC#, and INTD#. In addition, PCI interrupt request lines are shareable (as opposed to ISA interrupt request lines), hence, more than one expansion card can be coupled to a PCI interrupt request line. As an example, as shown in FIG. 6, expansion cards 500, 501, and 502 are all coupled to PCI interrupt request line INTA#. Furthermore, a PCI expansion card having multiple internal devices can be coupled to more than one PCI interrupt request line. For example, expansion card 504 is coupled to PCI interrupt request line INTB# and PCI interrupt request line INTC#. Thus, in the case of expansion card 500, INTA# is coupled to the external interrupt request line 209 (shown in FIG. 2). As described above, the PCI interrupt request lines INTA#, INTB#, INTC#, and INTD# comprise a portion of the PCI bus 210 of FIG. 5.

PIR 607 is programmed at computer system 600 start up to route PCI interrupt signals received via INTA#, INTB#, INTC#, or INTD# to an appropriate IRQ line included in line 612 (e.g., IRQ 8 through IRQ 15) and line 613 (e.g., IRQ 0 through IRQ 7). PIC 610 and PIC 611 are thus cascaded such that any interrupt in the computer system 600 can access the single interrupt request line 621 of the CPU 620.

Figure 7:
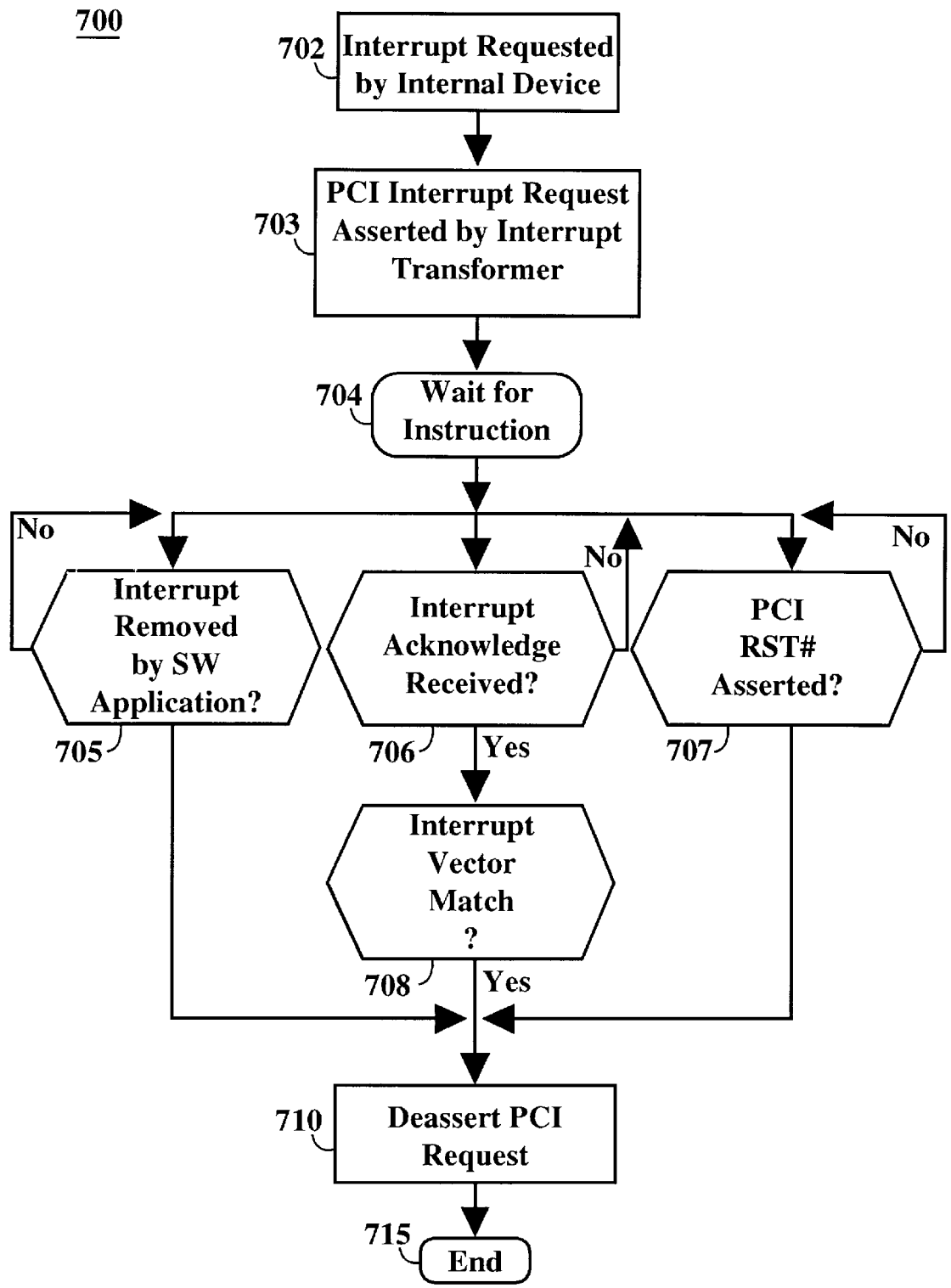
FIG. 7 shows a flow chart of the steps of a process in accordance with one embodiment of the present invention.

With reference now to FIG. 7, a flow chart of a process 700 performed by one embodiment of the present invention is shown. Process 700 of the present invention begins in step 702, when an internal device (e.g., internal device 211) requests an interrupt. The interrupt request from the internal device is coupled to the interrupt assertion circuit 206 of the present invention. The interrupt assertion circuit, as discussed above, receives the internal interrupt request (i.e., a state based interrupt) from the internal device 211 via the internal interrupt request line 207.

In step 703, the internal interrupt request from the internal device 211 is asserted by interrupt assertion circuit 206. The interrupt assertion circuit 206 asserts a PCI interrupt signal via external interrupt request line 209 and PCI interface 208. The PCI interrupt signal is subsequently coupled to a PCI interrupt request line (e.g., INTA#) of PCI bus 210. The PCI interrupt is received by PIR 607 of FIG. 6, routed to IRQ5, and coupled to CPU 620 via PICs 610 and 611, all of FIG. 6. Upon receiving the PCI interrupt signal, and on the next available instruction boundary, CPU 620 automatically saves its place in any currently executing program, and generates two interrupt acknowledge bus cycles. In accordance with the PCI specification, the first of these bus cycles is an interrupt acknowledge bus cycle. FRAME# is asserted while all four C/BE#[3:0] signals are low, as described above. The second of these bus cycles is a vector request bus cycle where CPU 620 requests a vector to the appropriate ISR.

In step 704, interrupt assertion circuit 206 of the present invention continues to assert the PCI interrupt signal. Interrupt transformer 200 keeps the PCI interrupt signal asserted and concurrently executes steps 705, step 706, and step 707.

In step 705, the interrupt assertion circuit waits for the removal of the internal interrupt request via the ISR or some other software application. Software removal of the internal interrupt request causes the interrupt assertion circuit 206 to immediately deassert the PCI interrupt signal. Thus, if there is a software removal of the internal interrupt request, process 700 proceeds to step 710 via step 705.

In step 706, interrupt acknowledge detect circuit 202 of the present invention waits for an interrupt acknowledge bus cycle, as described above. An interrupt acknowledge bus cycle occurs when FRAME# is asserted while all four C/BE#[3:0] signals are low, as described above. Thus, if there is an interrupt acknowledge bus cycle, the process 700 proceeds to step 708.

In step 708, vector match circuit 203 of the present invention waits for the presence of the appropriate vector on A/D[3:0] of internal bus 205, as described above. If a vector match does not occur, the interrupt acknowledge received in step 706 was for a different interrupting device (e.g., expansion card 501) and process 700 proceeds back to step 704. If a vector match occurs, process 700 proceeds to step 710 via step 708.

In step 707 the interrupt assertion circuit waits for the assertion of the PCI reset signal RST#. In accordance with the PCI specification, PCI reset interface circuit 204 of the present embodiment causes the deassertion of the PCI interrupt signal if the RST# signal is asserted. This deassertion can occur asynchronously. Thus, if RST# is asserted, the process 700 proceeds to step 710 via step 707.

In step 710, the PCI interrupt signal is deasserted by interrupt assertion circuit 206. The PCI interrupt signal is deasserted in response to the successful completion of either step 705 (i.e., software removal of the interrupt), steps 706 and 708 (i.e., the reception of an interrupt acknowledge and corresponding vector match), or step 707 (PCI reset signal RST# asserted). Interrupt assertion circuit deasserts the PCI interrupt signal via external interrupt request line 209. Process 700 subsequently ends in step 715.

Thus, interrupt transformer 200 of the present invention provides a method and system for transforming state based interrupts to event based interrupts compatible with the PCI bus environment. In so doing, the present invention properly interfaces both legacy hardware designs and legacy software applications with the PCI bus environment's state based interrupt system. Hence, the process of the present invention accommodates a legacy hardware design (e.g., an ISA bus based peripheral device) without redesign of its interrupt logic or architecture. By ensuring legacy hardware designs interface properly with the PCI bus environment, the present invention accommodates legacy software applications built to work with these legacy hardware designs. The present invention accommodates these legacy software applications without requiring a redesign of their software code. In this manner, interrupt transformer 200 of the present invention accommodates preexisting, legacy hardware designs and legacy software applications in a manner transparent to both.

The present invention, a method and system for transforming computer system interrupts from state based interrupts to event based interrupts, is thus described. While the present invention has been described in particular embodiments, it should be appreciated that the present invention should not be construed as limited by such embodiments, but rather construed according to the below claims.

What is claimed is:

1. A system for transforming computer system interrupts from state based interrupts to event based interrupts, thereby allowing a state based interrupt device to function in an event based interrupt computer system, comprising:

an interrupt acknowledge detect circuit adapted to detect an interrupt acknowledge from a computer system;

a vector match circuit coupled to said interrupt acknowledge detect circuit, said vector match circuit adapted to receive an interrupt vector match from said computer system;

an interrupt assertion circuit coupled to said vector match circuit, said interrupt assertion circuit having an internal interrupt request line coupled to an internal device and an external interrupt request line, said interrupt assertion circuit adapted to assert an interrupt signal via said external interrupt request line to said computer system in response to receiving a state based interrupt from said internal device via said internal interrupt request line, said interrupt assertion circuit further adapted to deassert said interrupt signal when said interrupt acknowledge is detected by said interrupt acknowledge detect circuit and when said interrupt vector match is received by said vector match circuit, such that said state based interrupt is transformed to an event based interrupt signal.

2. The system of claim 1 further comprising:

a reset interface circuit coupled to said vector match circuit and said interrupt assertion circuit, said reset interface circuit adapted to receive a reset signal from said computer system, said interrupt assertion circuit adapted to deassert said interrupt signal when said reset signal is received by said reset interface circuit.

3. The system of claim 2, further comprising:

an internal bus coupled to said interrupt acknowledge detect circuit, said vector match circuit, and said reset interface circuit, said internal bus adapted to convey data signals from said computer system to said interrupt acknowledge detect circuit, said vector match circuit, and said reset interface circuit.

4. The system of claim 3, wherein said interrupt acknowledge detect circuit further comprises:

a first logic circuit coupled to receive said interrupt acknowledge via said internal bus; and a first latch circuit coupled to said first logic circuit, said first latch circuit adapted to output an interrupt acknowledge detect signal to said vector match circuit when said interrupt acknowledge is detected by said first logic circuit.

5. The system of claim 3, wherein said vector match circuit further comprises:

a second latch circuit coupled receive an interrupt acknowledge detect signal from said interrupt acknowledge detect circuit; and a second logic circuit coupled to said second latch circuit, said second logic circuit adapted to receive said vector match via said internal bus, said second logic circuit adapted to output a deassertion signal in response to receiving said vector match and said second latch circuit receiving said interrupt acknowledge detect signal.

6. The system of claim 3, wherein said reset interface circuit further comprises:

a third latch circuit coupled to receive a deassertion signal from said vector match circuit; and a third logic circuit coupled to said third latch circuit, said third logic circuit adapted to receive a reset signal from said computer system, said third logic circuit adapted to output said deassertion signal to said interrupt assertion circuit in response to receiving said reset signal or in response to receiving said deassertion signal.

7. The system of claim 3, wherein said interrupt assertion circuit further comprises:

a fourth latch circuit coupled to receive a deassertion signal from said reset interface circuit; and a fourth logic circuit coupled to said fourth latch circuit, said fourth logic circuit adapted to assert said interrupt signal via said external interrupt request line in response to receiving said state based interrupt via said internal interrupt request line, said fourth logic circuit adapted to deassert said interrupt signal in response to said fourth latch circuit receiving said deassertion signal.

8. The system of claim 7, wherein said interrupt assertion circuit further comprises said fourth logic circuit adapted to deassert said interrupt signal in response to a deassertion of said state based interrupt via said internal interrupt request line.

9. In a state based interrupt peripheral device, an interrupt transformer circuit for transforming peripheral device interrupts from state based interrupts to event based interrupts, comprising:

an interrupt acknowledge detect circuit adapted to detect interrupt acknowledge from a computer system;

a vector match circuit coupled to said interrupt acknowledge detect circuit, said vector match circuit adapted to receive an interrupt vector match from said computer system;

a reset interface circuit coupled to said vector match circuit and said interrupt assertion circuit, said reset interface circuit adapted to receive a reset signal from said computer system; and an interrupt assertion circuit coupled to said vector match circuit, said interrupt assertion circuit having an internal interrupt request line and an external interrupt request line.

10. The interrupt transformer circuit of claim 9 further comprising:

said interrupt assertion circuit adapted to assert an interrupt signal via said external interrupt request line to said computer system in response to receiving a state based interrupt via said internal interrupt request line, said interrupt assertion circuit adapted to deassert said interrupt signal when said interrupt acknowledge is detected by said interrupt acknowledge detect circuit and when said interrupt vector match is received by said vector match circuit such that said interrupt signal is an event based interrupt signal, and said interrupt assertion circuit further adapted to deassert said interrupt signal when said reset signal is received by said reset interface circuit.

11. The interrupt transformer circuit of claim 10 further comprising:

an internal bus coupled to said interrupt acknowledge detect circuit, said vector match circuit, and said reset interface circuit, said internal bus adapted to convey data signals from said computer system to said interrupt acknowledge detect circuit, said vector match circuit, and said reset interface circuit.

12. The system of claim 11 wherein said interrupt acknowledge detect circuit further comprises:

a first logic circuit coupled to detect said interrupt acknowledge via said internal bus; and a first latch circuit coupled to said first logic circuit, said first latch circuit adapted to output an interrupt acknowledge detect signal to said vector match circuit when said interrupt acknowledge is detected by said first logic circuit.

13. The system of claim 12 wherein said vector match circuit further comprises:

a second latch circuit coupled receive said interrupt acknowledge detect signal from said interrupt acknowledge detect circuit; and a second logic circuit coupled to said second latch circuit, said second logic circuit adapted to receive said vector match via said internal bus, said second logic circuit adapted to output a deassertion signal in response to receiving said vector match and said second latch circuit receiving said interrupt acknowledge detect signal.

14. The system of claim 13 wherein said reset interface circuit further comprises:

a third latch circuit coupled to receive said deassertion signal from said vector match circuit; and a third logic circuit coupled to said third latch circuit, said third logic circuit adapted to receive a reset signal from said computer system, said third logic circuit adapted to output said deassertion signal to said interrupt assertion circuit in response to receiving said reset signal or in response to receiving said deassertion signal.

15. The system of claim 14, wherein said interrupt assertion circuit further comprises:

a fourth latch circuit coupled to receive said deassertion signal from said reset interface circuit; and a fourth logic circuit coupled to said fourth latch circuit, said fourth logic circuit adapted to assert said interrupt signal via said external interrupt request line in response to receiving said state based interrupt via said internal interrupt request line, said fourth logic circuit adapted to deassert said interrupt signal in response to said fourth latch circuit receiving said deassertion signal.

16. The system of claim 15, wherein said interrupt assertion circuit further comprises said fourth logic circuit adapted to deassert said interrupt signal in response to a deassertion of said state based interrupt via said internal interrupt request line.

17. The system of claim 16, wherein said deassertion of said state based interrupt is in response to an interrupt service routine on said computer system.

18. In a peripheral device coupled to a bus architecture interrupt system, a method for transforming state based interrupts to event based interrupts, the method comprising the steps of:

a) asserting an external interrupt request to an event based interrupt bus in response to receiving a state based internal interrupt request from an internal device;

b) determining whether said state based internal interrupt request is removed by a software application;

c) determining whether an interrupt acknowledge is detected via said event based bus;

d) determining whether an interrupt vector match is received via said event based bus;

e) determining whether a reset signal is received via said event based bus; and f) deasserting said external interrupt request in response to receiving said interrupt acknowledge and said vector match, or receiving said reset signal, or removal of said state based internal interrupt request such that said external interrupt request is an event based interrupt request, thereby allowing said internal device to function with said event based interrupt bus.

* * * * *